(12) United States Patent
Koeppendoerfer et al.

(10) Patent No.: US 10,361,014 B2
(45) Date of Patent: Jul. 23, 2019

(54) DATA CABLE WITH INTERNAL ELEMENT

(71) Applicant: LEONI Kabel GmbH, Nuremberg (DE)

(72) Inventors: Erwin Koeppendoerfer, Schwabach (DE); Daniel Hartmann, Nuremberg (DE); Rainer Poehmerer, Winkelhaid (DE); Johannes Nachtrab, Windsbach (DE); Dominik Dorner, Pleinfeld (DE)

(73) Assignee: LEONI Kabel GmBH, Nuremberg (DE)

( * ) Notice: Subject to any disclaimer, the term of this patent is extended or adjusted under 35 U.S.C. 154(b) by 0 days.

(21) Appl. No.: 15/604,022

(22) Filed: May 24, 2017

(65) Prior Publication Data

US 2017/0345530 A1 Nov. 30, 2017

(30) Foreign Application Priority Data

May 25, 2016 (DE) ........................ 10 2016 209 138

(51) Int. Cl.
*H01B 11/00* (2006.01)
*H01B 11/02* (2006.01)
*H01B 11/20* (2006.01)
*H04B 3/50* (2006.01)
*H01B 11/18* (2006.01)

(52) U.S. Cl.
CPC ........... *H01B 11/002* (2013.01); *H01B 11/02* (2013.01); *H01B 11/20* (2013.01); *H01B 11/1891* (2013.01); *H04B 3/50* (2013.01)

(58) Field of Classification Search
CPC .................................................... H01B 3/441
USPC ..................................................... 174/110 R
See application file for complete search history.

(56) References Cited

U.S. PATENT DOCUMENTS

| 6,815,611 | B1* | 11/2004 | Gareis ................ | H01B 11/1025 |
| | | | | 174/113 R |
| 7,208,683 | B2 | 4/2007 | Clark | |
| 7,342,172 | B1 | 3/2008 | Wang et al. | |
| 8,198,536 | B2* | 6/2012 | Clark .................... | H01B 11/06 |
| | | | | 174/113 C |
| 8,704,094 | B1* | 4/2014 | Gebs ..................... | H01B 3/445 |
| | | | | 174/110 PM |
| 2005/0121222 | A1* | 6/2005 | Lee ........................ | H01B 11/12 |
| | | | | 174/113 R |

(Continued)

FOREIGN PATENT DOCUMENTS

| DE | 20 2014 009 498 U1 | 2/2015 |
| DE | 10 2014 223 119 A1 | 5/2016 |
| GB | 1221498 A | 2/1971 |

OTHER PUBLICATIONS

German Search Report from German Application No. 10 2016 209 138 7, pp. 1-6, dated Mar. 3, 2017, with cover sheet (3 pages).

*Primary Examiner* — Stanley Tso
(74) *Attorney, Agent, or Firm* — Straub & Straub; Michael P. Straub; Stephen T. Straub

(57) ABSTRACT

The present invention relates to a data cable. An embodiment of the data cable comprises at least one wire pair and an internal element. The at least one wire pair has two wires running parallel in the longitudinal direction of the data cable. The internal element has at least one flat section. The at least one wire pair and the internal element are arranged in the data cable in such a way that the at least one wire pair lies against the at least one flat section of the internal element.

8 Claims, 9 Drawing Sheets

(56) References Cited

U.S. PATENT DOCUMENTS

2008/0251277 A1 10/2008 Hopkinson
2014/0291020 A1* 10/2014 Wessels, Jr. ......... H01B 11/125
174/74 R

* cited by examiner

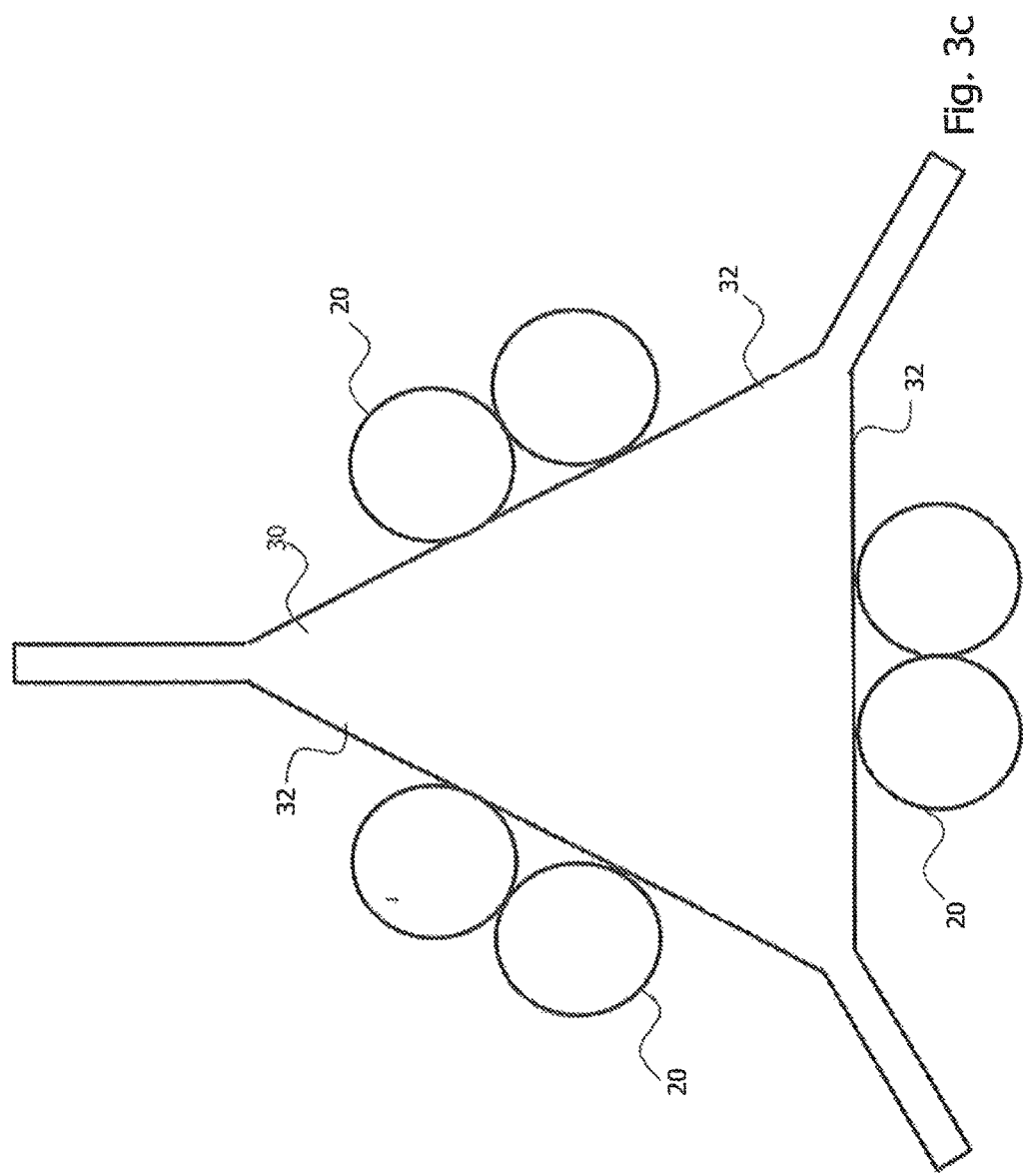

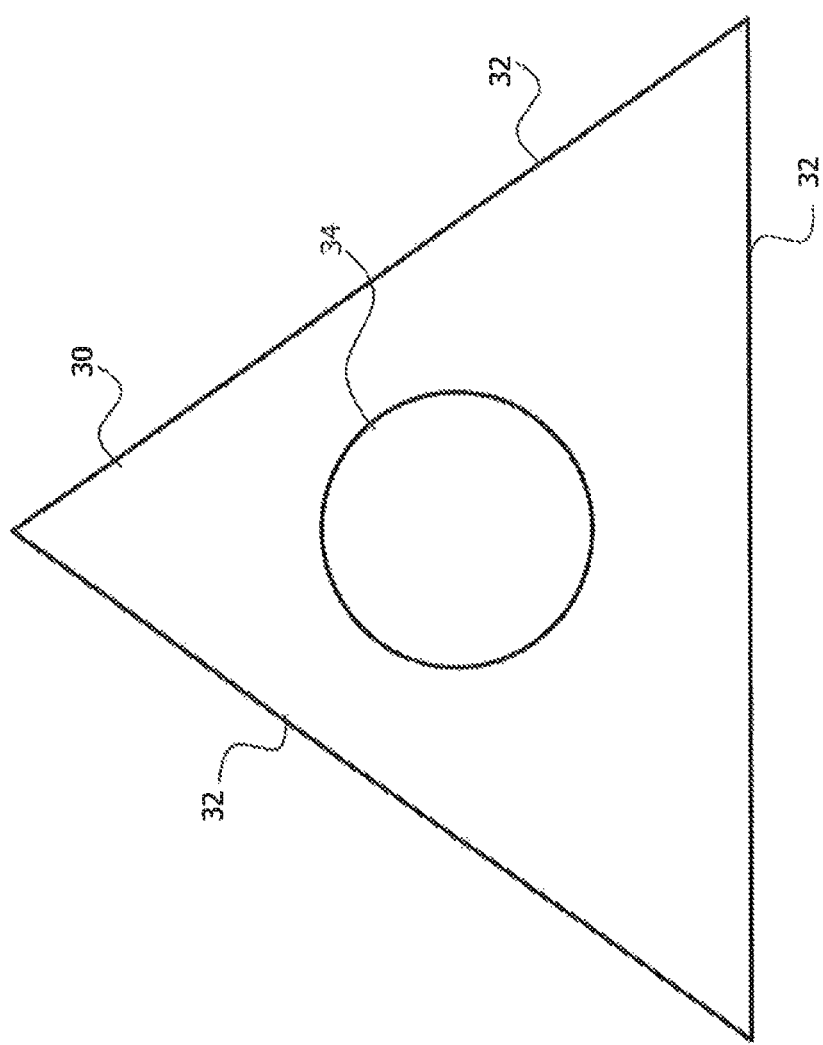

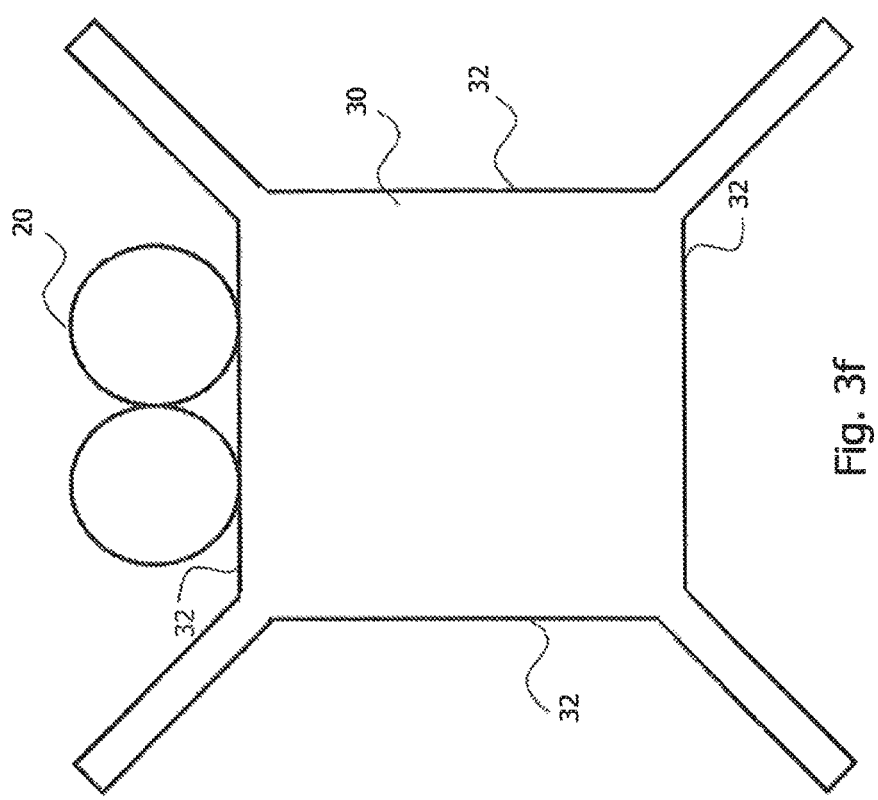

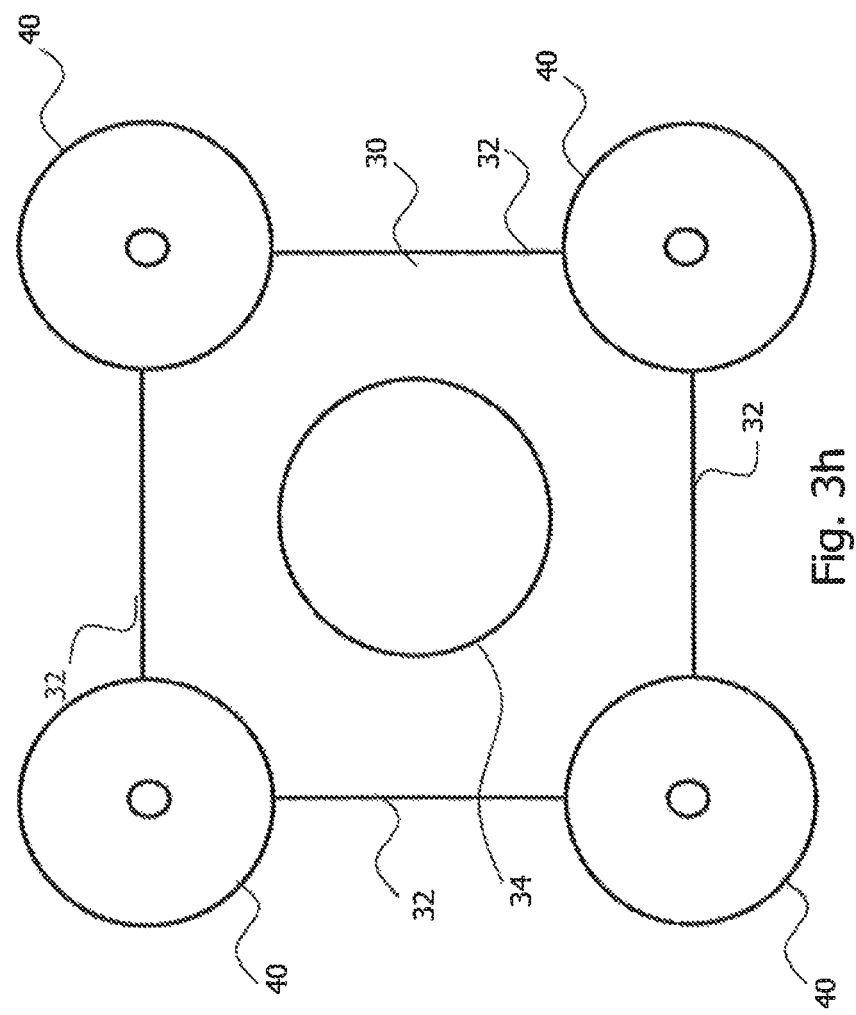

DATA CABLE WITH INTERNAL ELEMENT

FIELD

The present invention relates to a data cable.

BACKGROUND

Data cables for the transmission of data (mostly termed data cables in short below) are used in a wide variety of technical applications. A data cable is a medium for the transmission of signals, i.e. the data are normally transmitted by means of signals as data signals. The transmission can generally take place on an electrical basis (electrical data cable), optical basis (optical data cable) or a combination of both (normally as hybrid cables, sometimes also termed combination cables).

It is known in connection with data cables to separate several wire pairs spatially from one another. The current-carrying wire is often used for the separation. Forces perpendicular to the longitudinal axis of the data cable cause the wire pairs to be pressed onto the current-carrying wire (power supply) and they can be deformed by this. This results in an asymmetry in the wire pairs that negatively influences the transmission characteristics.

The need therefore exists to provide an improved data cable with regard to the transmission characteristics.

SUMMARY

A data cable is provided for this that comprises at least one wire pair and an internal element. The at least one wire pair has two wires running parallel in the longitudinal direction of the data cable. The internal element has at least one flat section. The at least one wire pair and the internal element are arranged in the data cable in such a way that the at least one wire pair lies against the at least one flat section of the internal element.

Such a wire pair with two wires running parallel in the longitudinal direction of the data cable is often termed a parallel pair in technical language. The internal element can extend in a longitudinal direction inside the data cable. For example, the length of the internal element can correspond at least nearly to the length of the at least one wire pair and/or the length of the data cable.

Since the at least one wire pair lies against the at least one flat section of the internal element, bending or rounding of the wire pair due to forces running perpendicular to the longitudinal axis of the data cable is at least reduced and is ideally avoided. No asymmetry or at least a reduced asymmetry in the wire pair arises due to this. The symmetry of the line(s) responsible for the data transmission is increased. The transmission characteristics are improved. Interference-free transmission is thus possible over a large distance.

The shape of the internal element can be adapted to the number of wire pairs. The number of wire pairs can be smaller than or equal to the number of flat sections, for example. A wire pair can be associated respectively with a flat section of the internal element. For example, each wire pair of the at least one wire pair can be associated with a related flat section of the at least one flat section and lie accordingly against this.

In one embodiment, the data cable can have at least two wire pairs (as the at least one wire pair), for example, i.e. the number of wire pairs can be at least two. The internal element can have at least two flat sections accordingly. The at least two wire pairs and the internal element can be arranged in the data cable in such a way that one of the at least two wire pairs respectively lies against one of the at least two flat sections of the internal element.

In addition, the internal element can be arranged e.g. centrally in the data cable. The internal element and the wire pairs can all be twisted together, for example. Expressed another way, the wire pairs and if applicable other elements of the data cable do not run helically around the e.g. flat internal element, but are forced into a helical spiral together with the internal element. The position of the elements relative to one another, such as e.g. the position of the respective wire pairs relative to their associated flat section of the internal element, is always the same. For manufacturing it is conceivable that during the stranding the internal element also rotates, so that in the longitudinal direction of the data cable the respective wire pair lies against its associated flat section. However, the respective wires of the wire pairs run parallel to one another, i.e. they are not stranded with one another. Expressed another way, the wires of the parallel pair running in parallel extend along the longitudinal axis of the data cable parallel and thus unstranded in relation to one another. In this case their arrangement relative to the internal element and their associated flat section does not change. The data cable can thus be regarded as formed in such a way that at least one section of the data cable oriented towards the parallel pair is configured flat at least in sections.

The internal element can have different forms. For example, the internal element can have a flat, planar or polygonal cross section related to the longitudinal direction of the data cable. A triangular, square, pentagonal or hexagonal shape, for example, is conceivable as a polygonal configuration of the cross section of the internal element. Even more than six angles are possible. The corresponding edges of the polygon can be used as a flat section, i.e. as a contact surface for a wire pair. Depending on the cross section of the internal element, the internal element can be formed flat, for example, e.g. in the form of a flat conductor, or polyhedral, e.g. cuboid or comprise such a flat conductor. The flat conductor can be formed as flat wire, as braided sleeving or as rolled round strand. The corresponding side faces of the internal element can be used as a flat section, e.g. as a contact surface for a wire pair. In the case of a flat internal element, the opposing faces of the internal element can each serve as a flat section. In the case of a polyhedral internal element, the side faces of the internal element can each serve as a flat section. The internal element can have any cross sectional shape as long as at least one flat section is provided.

The at least one wire pair can be formed for data transmission. For example, the at least one wire pair can be formed for a data transmission at high data rates. A high data rate can be understood here as a data rate that corresponds to a current data transmission standard for which the data cable is provided. In the case of USB, the concept of high data rates can be understood as a data rate that can be achieved with a current USB specification. This data rate can be higher than the data rate of a corresponding previous standard, such as e.g. according to the USB 2 specification. Purely by way of example, at the time of the present application a high data rate can be understood as a data rate of between 5 and 10 Gbit/s.

The data cable can comprise a current-carrying element, which is arranged separately from the internal element in the data cable. The current-carrying element can be a current-carrying wire or a current-carrying conductor, for example.

The internal element can comprise a current-carrying element. The current-carrying element of the internal element can be an additional current-carrying element, which is provided in addition to the aforesaid current-carrying element and is arranged separately from the internal element in the data cable. However, the current-carrying element of the internal element can also be an alternative configuration in which, instead of the current-carrying element arranged separately from the internal element in the data cable, the current-carrying element is comprised by the internal element. The current-carrying element can be a current-carrying wire or a current-carrying conductor. For example, the internal element can contain the current-carrying element in one piece, i.e. the current-carrying element can be formed as the internal element.

The internal element can comprise a conductor element. The conductor element can be formed as a solid wire, braid, flat conductor, wire mesh or knitted wire or can comprise any combinations of these, for example several of the aforesaid elements. The conductor element can comprise the current-carrying element and/or one or more other types of conductor elements. These one or more other types of conductor elements can comprise at least one coaxial cable, at least one single wire, at least one optical fibre, such as e.g. a polymer optical fibre (POF) and/or at least one glass fibre, and/or cable pairs, or be formed as such.

The data cable can comprise at least one wire for a data transmission at low data rates. The at least one wire can be arranged separately from the internal element in the data cable. In addition or alternatively, the at least one wire for a data transmission at low data rates can be formed as part of the internal element. For example, the internal element can contain the at least one wire for a data transmission at low data rates in one piece, i.e. the at least one wire for a data transmission at low data rates can be integrated into the internal element. Low data rates can be understood in this context as a data rate achieved by a data transmission standard for which there is a successor standard with a higher data rate. In reference to USB, a data transmission at low data rates can involve a data rate achievable according to the USB 2 specification, for example.

The at least one wire for the data transmission at low data rates can be arranged, for example, on a short side/on a short section of the internal element. The short side/short section can be understood as a side or section which—seen transversely to the longitudinal axis of the data cable—is shorter than the flat section. In the case of an internal element with a flat cross section or square cross section, a wire of this kind can be located on one or both short sides of the internal element, for example. In the case of other forms of the internal element, it is conceivable that the at least one wire for the data transmission at low data rates extends respectively along one edge (seen in cross section at one or more corners of the cross section of the internal element). For example, in a polyhedral construction of the internal element (form of the cross section of the internal element with many corners) the at least one wire for the data transmission at low data rates can extend along one edge of the internal element (seen in cross section at one or more corners of the internal element).

The width of the flat section transverse to the longitudinal direction of the data cable can be coordinated in each case to the width of the associated wire pair transverse to the longitudinal direction of the data cable. The width of the flat section and the width of the associated wire pair can be coordinated to one another, for example, so that in the event of forces acting perpendicular to the longitudinal axis of the data cable, the at least one wire pair is not or is only imperceptibly (imperceptibly in the sense that no substantial asymmetry results) deformed/bent. For example, the flat section can be at least as wide as a distance of the two centres (centre points) of the wires of the wire pair. For example, the flat section can be at least as wide as the width of the wire pair. The at least one wire pair can be enclosed by a shield, for example a foil shield. The width of the flat section can correspond at least approximately to the width of the shield or can be at least as wide as the width of the shield. Due to the aforesaid configurations, a complete lying against and supporting of the at least one wire pair by the associated flat section can be achieved even with the occurrence of forces arising perpendicular to the longitudinal axis of the data cable and a deformation of the at least one section can thus be prevented.

Purely by way of example, the data cable can be formed as a Universal Serial Bus (USB) data cable. Other configurations are possible.

BRIEF DESCRIPTION OF THE FIGURES

The present disclosure is to be explained further with reference to figures.

FIGS. 3a to 3h show schematically different variants of the internal element, which can be used in the data cable according to the embodiment from FIG. 2.

DETAILED DESCRIPTION

Specific details are set out below, without being restricted to these, to provide a complete understanding of the present disclosure. However, it is clear to a person skilled in the art that the present disclosure can be used in other embodiments that can deviate from the details set out below. For example, specific configurations and arrangements of a data cable are described below that should not be regarded as limiting. Furthermore, various application fields of the data cable are conceivable. Purely by way of example, only the application in offices, public institutions or in different transport means is cited at this point. A specific exemplary field of use of a data cable described in greater detail below is in the car industry (often also termed automotive) sector. In this sector it is often the case that such a data cable is led from a central control apparatus to a USB socket arranged on or in the vehicle.

Figure 1B:
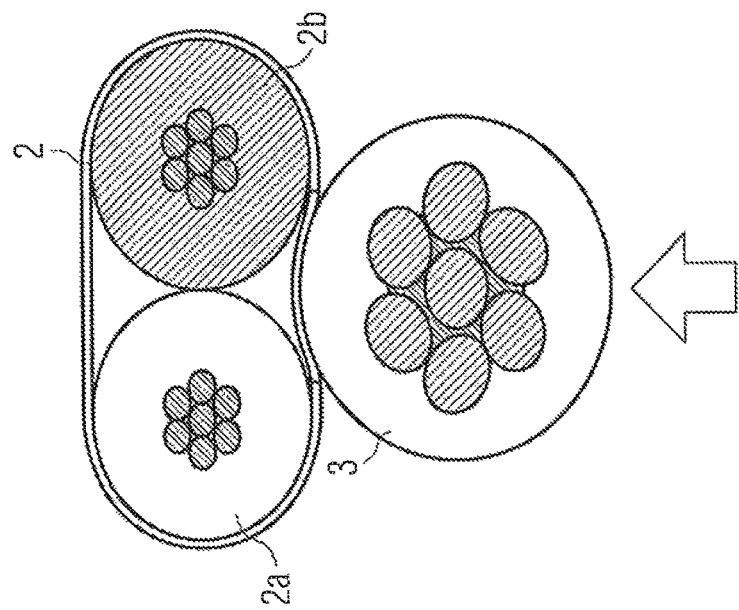
FIG. 1b shows schematically a deformation of the data cable from FIG. 1a leading to asymmetry.
Figure 1A:
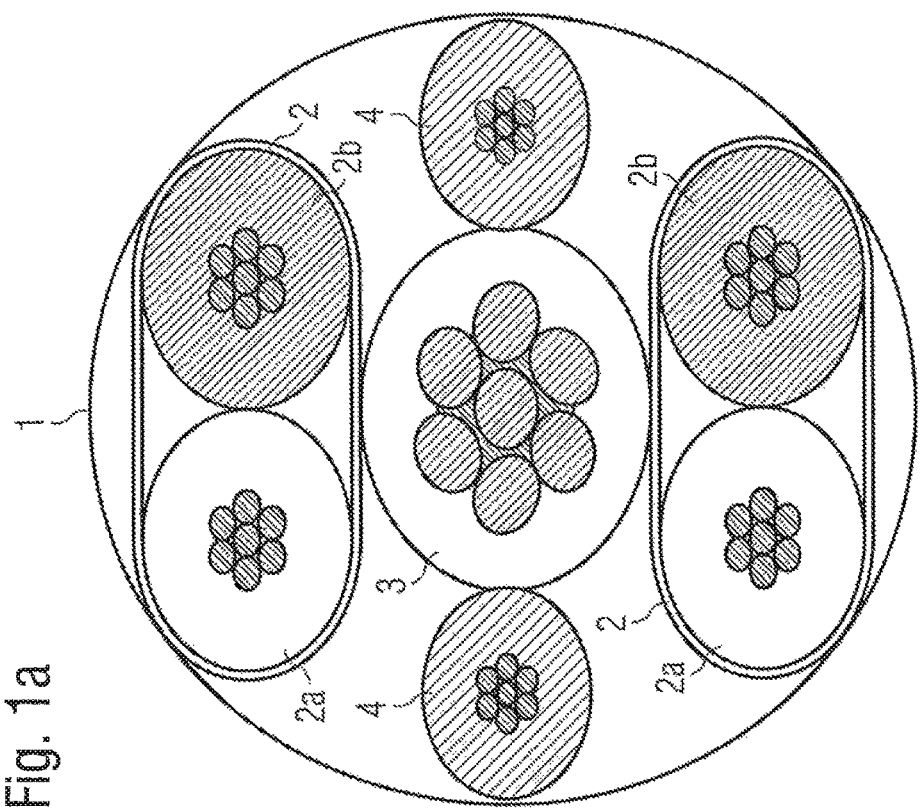
FIG. 1a shows schematically a basic construction of a data cable.

FIG. 1a shows a data cable 1 with two wire pairs 2 for data transmission at high data rates. Each of the wire pairs 2 has two wires 2a, 2b running in parallel in the longitudinal direction of the data cable 1. Such a wire pair 2 can also be termed a parallel pair. A conductor used for the power supply (power supply conductor 3 in brief below) is provided centrally in the data cable 1. The power supply conductor 3 is formed as a round conductor. Furthermore, wires 4 are shown, which form a wire pair for data transmission at a low data rate in the data cable 1. The data cable itself is enclosed by a protective sheath. In the manufacture and use of a data cable 1 with a configuration according to FIG. 1a, forces perpendicular to the longitudinal axis of the data cable 1 (the line) become active, which forces press or squeeze the wire pairs 2 onto the power supply conductor 3 among other things. In this case, as shown by way of example in FIG. 1b with reference to the top wire pair 2, the rounding of the power supply conductor 3 will deform a foil shield enclosing both wires 2a, 2b of the wire pair 2 on one side. This creates an asymmetry in the wire pairs 2, which negatively influences the transmission characteristics. The foil shield does not fix the wire pair 2 to a sufficient extent to prevent the deformation. Such a foil shield normally has a high expansion/extensibility, so that it is expanded by the forces generated during the pressing onto the rounding and does not fix the wires of the wire pair adequately.

Even the use of specific fillers/filling elements next to the power supply conductor 3, for example on the outsides of the foil shield, does not lead to an adequate fixing of the wire pair 2 to prevent the deformation. On the one hand, such filling elements often do not have sufficient strength for a supporting effect. On the other hand, the filling elements can be displaced in the data cable 1 due to the influence of force. The displacement of the filling elements leads to no or only negligible support of the wire pair 2 being provided, so that the wire pair 2 deforms as described.

Figure 2:
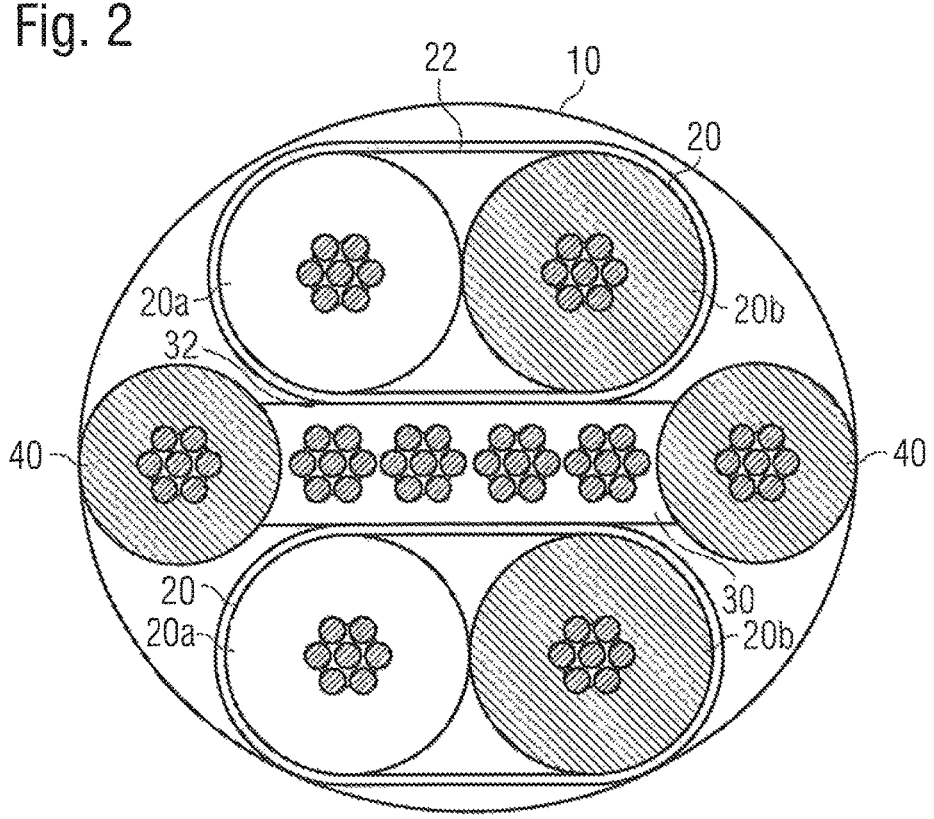
FIG. 2 shows schematically a possible configuration of a data cable according to an embodiment.

In FIG. 2, a data cable 10 is shown according to a possible embodiment. The data cable 10 has for example two wire pairs 20 for high data rates. Each of the wire pairs 20 (top and bottom wire pair 20 below) has two wires 20a, 20b, which run parallel in the longitudinal direction of the data cable 10. The wires 20a, 20b of the wire pairs 20 are enclosed by a foil shield 22. Two wire pairs 20 are shown purely as an example in FIG. 2. Nevertheless, the data cable 10 can also have only one such wire pair 20 or more than two such wire pairs 20.

The data cable 10 further has an internal element 30. The internal element 30 extends in a longitudinal direction of the data cable 10 (parallel to the longitudinal axis of the data cable 10). The internal element 30 is shown in the embodiment from FIG. 2 purely as an example as a flat conductor with a flat cross section. Other forms are conceivable, as will be described in regard to FIGS. 3a to 3h. The internal element 30 has two flat or planar sections 32. Purely as an example, the power supply is arranged in the flat internal element 30 in FIG. 2. However, this should be understood as being purely by way of example. Alternatively the power supply can also be arranged outside of the flat internal element 30. The data cable 10 is enclosed by a protective sheath 50. The protective sheath 50 can comprise polyvinyl chloride, for example, or consist of this.

Furthermore, a wire 40 is arranged purely as an example on each short side (short with regard to the greater width of the flat section 32) of the flat internal element 30, which wires together form a wire pair for data transmission at low data rates. The wires 40 can each extend in the longitudinal direction of the data cable 10 along the short side of the internal element 30. These wires 40 can also be omitted or arranged separately from the internal element 30 in the data cable 10. The internal element 10 and the wire pairs 20 are arranged in the data cable 10 so that each of the wire pairs 20 lies against one of the flat sections 32 of the internal element 30. Each of the wire pairs 20 extends in the longitudinal direction of the data cable 10 along the associated flat section 32 of the internal element 30. Even if forces now act on the wire pairs 20 perpendicular to the longitudinal direction of the data cable 10, as was described in regard to FIG. 1a, the flat sections 32 counteract these forces and support the wire pairs 20. The wire pairs 20 are thus not deformed/bent. Asymmetries are at least reduced by this, ideally even completely avoided. Furthermore, compared with the configuration according to FIG. 1a, the roundness of the overall cable 2 increases in cross section.

Even if two wire pairs 20 are shown purely as an example in regard to FIG. 2, the configuration from FIG. 2 is not restricted to this. For example, instead of one of the wire pairs 20, filling elements can be provided, which can have an at least similar form to the corresponding wire pair 20 but a different function, e.g. no function.

It is to be briefly outlined below how the data cable 10 can be configured as a USB data cable.

Conventional USB 2 data cables (for example, USB 2.0 data cables) normally have a signal wire pair (D+ and D−) and a wire pair for the power supply (GND, VBUS). Thus e.g. in FIG. 2 a wire 40 can be used as wire D+ and the other wire 40 as wire D−. In this case, in USB 2 the data transmission takes place symmetrically via the signal wire pair 40, wherein the data signal ("signal portion") is transmitted through one of the wires 40 and the signal inverted to the data signal ("reference portion") through the other of the wires 40. To reduce and ideally avoid transmission interference, the wires 40 of the signal conductor pair are twisted and shielded. A receiver of the signal determines the differential voltage of the data signal transmitted via the signal wire pair. Interference acting on both sides of the signal wire pair to the same extent can be eliminated by this.

The USB 3.0 standard specified in 2008 makes data rates of 5 Gbit/s possible. USB 3 data cables (for example USB 3.0 data cables) have, in addition to the signal wire pair (D+ and D−) explained above in regard to USB 2 and the power supply (GND, VBUS) at least two additional signal wire pairs (SSTX+ and SSTX−; SSRX+ and SSRX−) as well as an additional ground connection GND. A differential data signal can be transmitted via each of these two signal wire pairs. Higher data rates are achieved by this than with the conventional USB 2 standard. More precisely speaking, the wire SSTX+ is used for data transmission from the host to the apparatus, the wire SSTX− is sometimes twisted with SSTX+, the wire GND is used for the ground connection, the wire SSRX+ is used for data transmission from the apparatus to the host and the wire SSRX− is sometimes twisted with SSRX+. On account of the additional wires, new plugs on the host and on the connected equipment are necessary for USB 3.0 as well as new data cables. The data cables are thicker and less flexible on account of the increased number of wires and the better HF transmission properties required. Most recently the previous USB 3.0 specification merged into the USB 3.1 specification, is now officially called USB 3.1 and facilitates data rates of up to 10 Gbit/s.

In regard to FIG. 2, one of the wire pairs 20 can thus be used for the data transmission from the host to the apparatus and the other of the wire pairs 20 for the data transmission from the apparatus to the host. For example, the wire 20a of the top wire pair 20 can form the wire SSTX+ and the wire 20b of the top wire pair 20 can form the wire SSTX−, wherein the wire 20b runs parallel to the wire 20a. Correspondingly the wire 20a of the bottom wire pair 20 can form the wire SSRX+ and the wire 20b of the bottom wire pair 20 can form the wire SSRX−, wherein the wire 20b runs parallel to the wire 20a. Furthermore, the wire GND can be arranged in the internal element 30 or outside of the internal element 30. This specific realisation should naturally be understood as purely exemplary and other configurations are conceivable.

FIGS. 3a to 3h show different, not conclusive examples of the configuration of the internal element 30, which can be used in combination with the data cable 10 from FIG. 2.

Figure 3A:
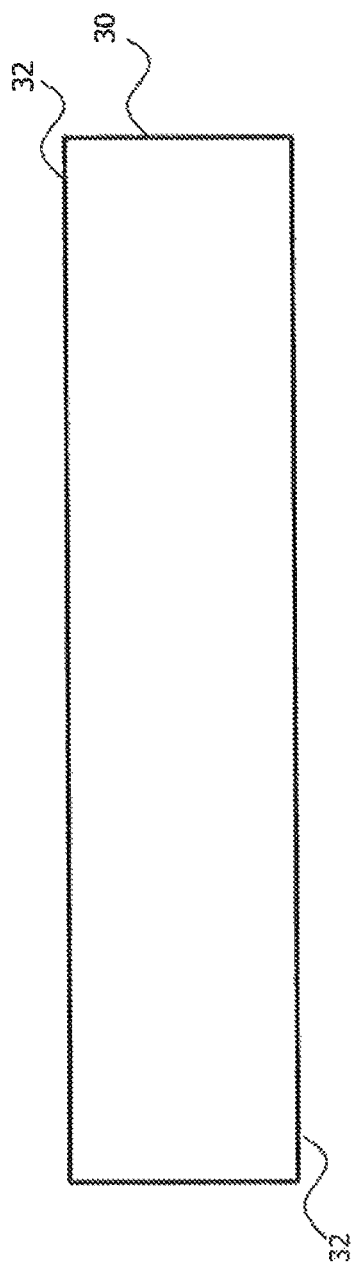

FIG. 3a shows a flat internal element 30 such as used in FIG. 2. In contrast to the internal element 30 from FIG. 2, however, the internal element 30 from FIG. 3a has no power supply. As described with reference to FIG. 2, a wire pair 20 can be arranged respectively on the flat sections 32 of the internal element 30. Alternatively, a wire pair 20 can be arranged also just on one flat section 32 of the internal element 30. In this case it is conceivable to provide filling elements on the other flat section 32.

Figure 3B:
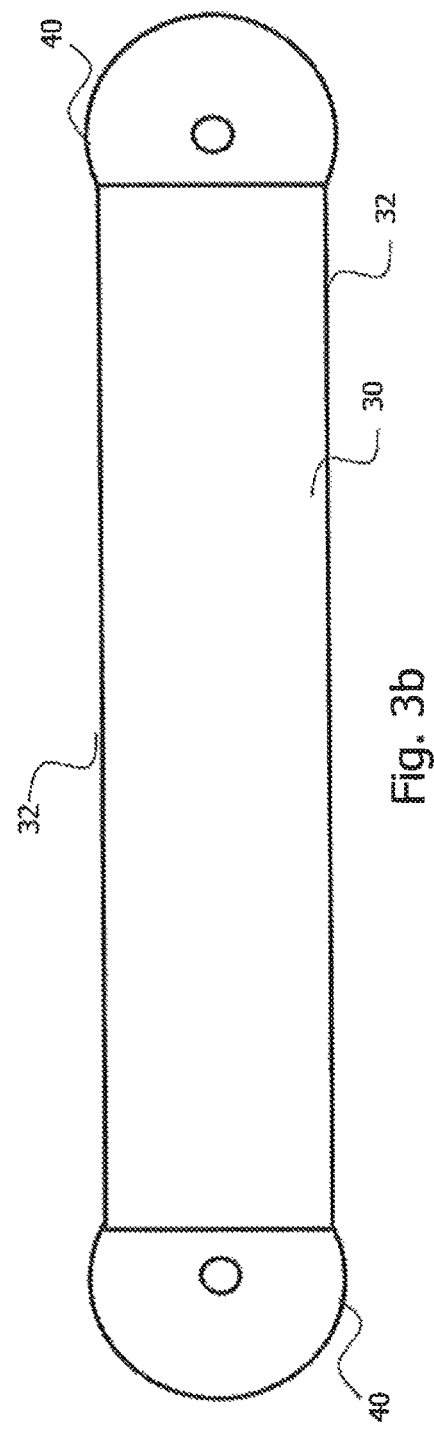

The internal element 30 from FIG. 3b is likewise formed flat. In addition to the internal element 30 from FIG. 3a, however, the internal element 30 from FIG. 3b has two wires 40 to form a wire pair for low data rates. The wires 40 are connected as an example in FIG. 3b in one piece to the short sides of flat internal element 30.

FIG. 3c shows a variant of the internal element 30 with a triangular cross section. The internal element 30 is therefore polyhedral. The cross section of the internal element 30 shown in FIG. 3c is not exactly triangular. On the contrary, the respective edges are formed cavern-shaped. The internal element 30 from FIG. 3c has three flat sections 32. A wire pair 20 can lie against each of the flat sections 32 as shown in FIG. 3c. Alternatively a filling element instead of a wire pair 20 can lie against one or more of the flat sections 32. For example, the number of wire pairs 20 amounts at maximum to the number of flat sections 32. The cavern-shaped configuration of the edges makes it possible that the wire pairs 20 are each fitted at least approximately into their associated flat section 32.

The internal element 30 from FIG. 3d also has an at least approximately triangular cross section. In contrast to an exact triangle, the corners can be rounded. As described with reference to FIG. 3c, the wire pairs 20 can lie against one or more of the three flat sections 32. A power supply line 34 is shown in the inside of the internal element 30 with at least an approximately triangular cross section. With reference to all variants shown of the internal element 30, it is conceivable that the material of the internal element has plastic, for example, or consists of plastic. For example, the internal element 30, as shown in FIG. 3d, can comprise the power supply conductor 34 and plastic around it.

Figure 3E:
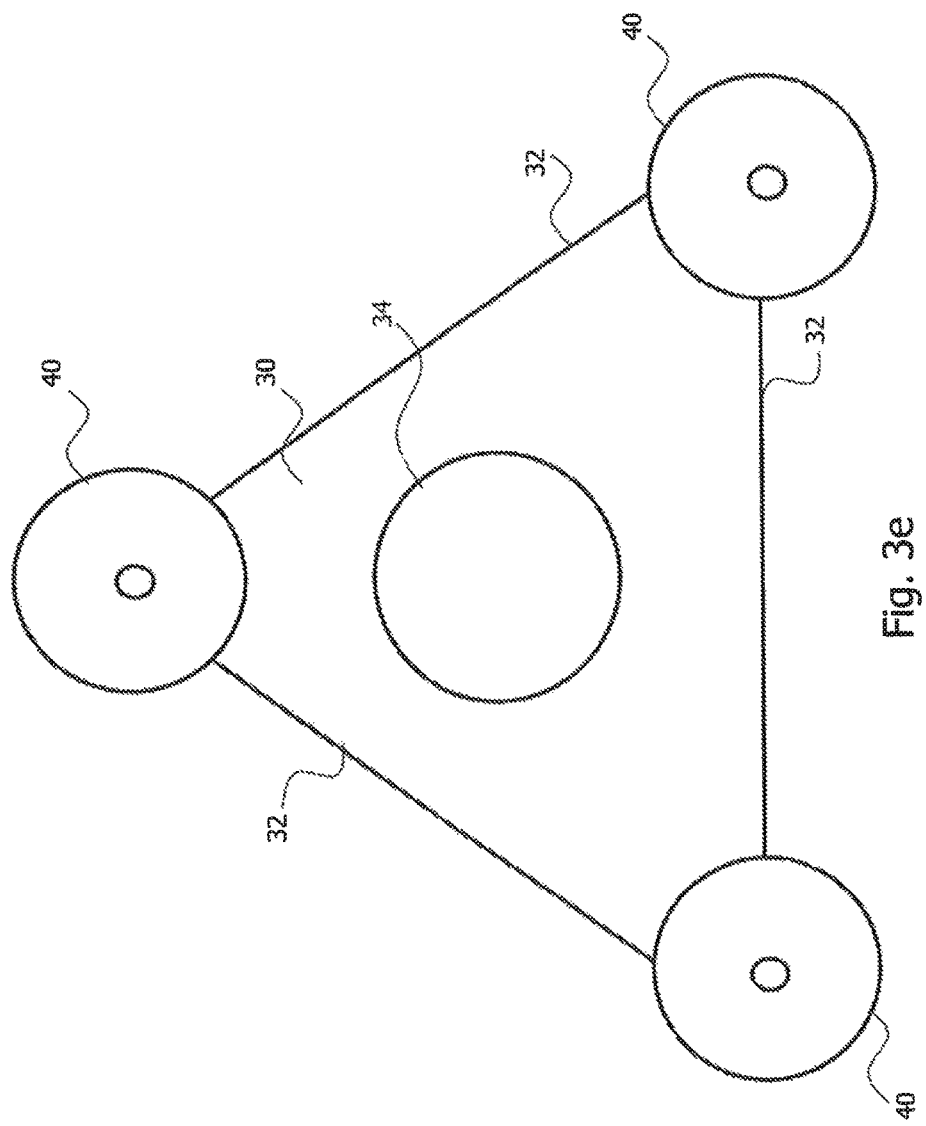

FIG. 3e also shows an internal element 30 with at least an approximately triangular cross section. The internal element 30 from FIG. 3e also has, like the internal element from FIG. 3d, a power supply conductor 34 in the inside as an example. At the corners of the triangle, i.e. at the edges of the internal element 30, wires 40 run respectively for the data transmission at low data rates. One or more of these wires 40 can also be replaced by corresponding filling elements. As described with reference to FIGS. 3c and 3d, a wire pair 20 can lie respectively against each flat section 32 of the internal element 30.

FIG. 3f shows an internal element 30 with an at least approximately polygonal, more accurately speaking a square cross section. The internal element 30 is accordingly a polyhedron, more accurately speaking a cuboid internal element 30. The internal element 30 therefore has four flat sections 32. Up to four wire pairs 20 can be used accordingly with the internal element 30 in that a wire pair 20 or a corresponding filling element is arranged on each flat section 32, as shown in FIG. 3f as an example with reference to one wire pair 20. The cross section of the internal element 30 shown in FIG. 3f is not exactly square, rather the respective edges are formed cavern-shaped. The cavern-shaped configuration of the edges makes it possible that the wire pairs 20 are each fitted at least approximately into their associated flat section 32.

Figure 3G:
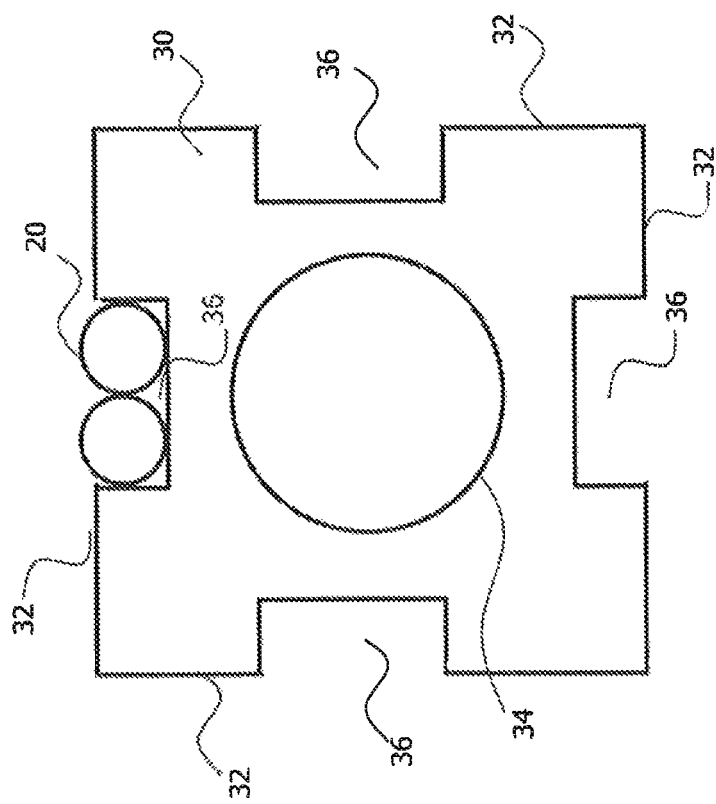

In the configurations from FIGS. 3g and 3h also, a wire pair 20 or a corresponding filling element can be arranged on each flat section 32, as illustrated in FIG. 3f as an example with reference to a wire pair 20. In FIG. 3g a power supply conductor 34 is additionally shown centrally. The internal element 30 from FIG. 3g has an at least approximately square cross section. The exemplary internal element 30 from FIG. 3g, however, does not have an exactly square cross section, because the internal element 30 has a recess or indentation 36 on each flat section. A wire pair 20 can be received respectively in these recesses 36, as illustrated by way of example in FIG. 3g with reference to a wire pair 20.

FIG. 3h also shows an internal element 30 with an at least approximately square cross section. Up to four wire pairs 20 can thus be used with the internal element 30. In addition, a power supply conductor 34 is provided in the internal element 30. At the corners of the square cross section, i.e. at the edges of the cuboid internal element 30, wires 40 for the data transmission at low data rates are arranged respectively.

The internal elements 30 shown in FIGS. 3a to 3h should be understood as being purely exemplary. Combinations of details of these internal elements 30 are conceivable. Other forms are also conceivable as long as these have at least one flat section 32. The wires 40 can be provided separately from the internal element 30, can be integrated in one piece into the internal element 30 or can be entirely absent from the data cable 10. The power supply conductor 34 can be provided in the internal element 30, for example integrated in one piece into this, or can be arranged in the data cable 10 separately, for example outside of the internal element.

With the aid of the configurations from FIGS. 2 and 3a to 3h, asymmetries are avoided and thus an interference-free data transmission achieved over large distances. The symmetry of the line(s) responsible for the data transmission is improved. A data transmission at high frequencies, e.g. at frequencies up to 7.5 GHz, is improved and if applicable even first made possible.

What is claimed is:

1. A data cable comprising:
   an internal element including a first wire integrated into the internal element,
   said first wire extending along a first short outermost side of the internal element in a longitudinal direction in which the data cable extends,
   a cross section of the internal element being in a plane perpendicular to the longitudinal direction in which the data cable extends and including a first flat outside portion,
   said first short outermost side of said internal element being a short side of the internal element which is shorter in length than said first flat outside portion,
   said internal element including multiple outermost sides and two current carrying wires,
   said two current carrying wires including said first wire and a second wire,
   said multiple outermost sides including said first short outermost side into which said first wire is integrated and a second short outermost side into which the second wire is integrated,
   the first and second wires being in directly opposite outermost sides of said cross section of said internal element; and
   at least one wire pair lying against the first flat outside portion of the cross section of the internal element,
   said at least one wire pair including two wires running parallel in the longitudinal direction of the data cable;

wherein the at least one wire pair is enclosed by a shield; and wherein a width of the first flat outside portion corresponds to the width of the shield.

2. The data cable according to claim 1,
wherein the data cable has at least two wire pairs and the cross section of the internal element has at least two flat portions on different sides of said cross section,
wherein the at least two wire pairs and the internal element run helically in the longitudinal direction of the data cable; and
wherein a first one of the two wire pairs lies against a first one of the two flat outside portions of the cross section of the internal element and a second one of the two wire pairs lies against a second one of the two flat outside portions of the cross section of the internal element.

3. The data cable according to claim 1, wherein the cross section of the internal element is polygonal.

4. The data cable according to claim 1, wherein the data cable comprises a current-carrying element which is arranged separately from the internal element in the data cable.

5. The data cable according to claim 1, wherein a width of the first flat outside portion is coordinated to the width of the at least one wire pair.

6. The data cable according to claim 1, wherein the internal element is formed as flat wire, braided sleeving or rolled round strand.

7. The data cable of claim 1, wherein said shield is a foil shield.

8. The data cable according to claim 1, wherein the cross section of the internal element is rectangular with said first flat outside portion corresponding to one side of said rectangular cross section.

* * * * *